United States Patent
Mogi et al.

(10) Patent No.: US 12,307,392 B2
(45) Date of Patent: May 20, 2025

(54) MOBILITY SYSTEM AND SERVER

(71) Applicant: TOYOTA JIDOSHA KABUSHIKI KAISHA, Toyota (JP)

(72) Inventors: Shunsuke Mogi, Chofu (JP); Shuta Yokota, Susono (JP); Susumu Oikawa, Yokohama (JP); Takahiro Sakamoto, Mishima (JP); Miyu Haga, Atsugi (JP); Kenjo Miyashita, Susono (JP); Naotoshi Kadotani, Mishima (JP); Satoshi Omi, Ebina (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/522,812

(22) Filed: Nov. 29, 2023

(65) Prior Publication Data
US 2024/0220872 A1 Jul. 4, 2024

(30) Foreign Application Priority Data
Dec. 28, 2022 (JP) .................. 2022-211973

(51) Int. Cl.
*G06Q 10/02* (2012.01)
*B60W 60/00* (2020.01)
(Continued)

(52) U.S. Cl.
CPC ....... *G06Q 10/02* (2013.01); *B60W 60/00253* (2020.02); *G05D 1/69* (2024.01);
(Continued)

(58) Field of Classification Search
None
See application file for complete search history.

(56) References Cited

U.S. PATENT DOCUMENTS

2018/0129981 A1 5/2018 Fujimoto
2018/0374002 A1* 12/2018 Li ........................... G06F 3/017
(Continued)

FOREIGN PATENT DOCUMENTS

JP 2018-073351 A 5/2018

OTHER PUBLICATIONS

J. Liu, L. Zhong, J. Wickramasuriya, and V. Vasudevan, "uWave: accelerometer-based personalized gesture recognition and its applications," Pervasive Mobile Comput, vol. 5, No. 6, pp. 657-675, 2009 (Year: 2009).*

*Primary Examiner* — George Chen
(74) *Attorney, Agent, or Firm* — Dinsmore & Shohl LLP

(57) ABSTRACT

A mobile object is configured to transmit, in response to a gesture of a traffic participant existing in the vicinity of the mobile object being a stop request, an inquiry signal including position information of the traffic participant to a server in order to confirm whether the mobile object provides a specific service to which the traffic participant who has performed the gesture is subscribed. The server is configured to determine, in response to receiving the inquiry signal, whether the traffic participant who made the gesture is one of users subscribed to the specific service and transmit an answer signal including a result of the determination to the mobile object. The mobile object is further configured to perform, in response to receiving the answer signal, an action according to a result of the determination included in the answer signal.

3 Claims, 3 Drawing Sheets

(51) Int. Cl.
    *G05D 1/69*           (2024.01)
    *G06V 20/58*         (2022.01)
    *G06V 40/10*         (2022.01)
    *G06V 40/20*         (2022.01)
    *H04W 4/40*          (2018.01)
    G05D 105/22        (2024.01)
    G05D 109/10        (2024.01)
    G05D 111/30        (2024.01)

(52) U.S. Cl.
    CPC .............. *G06V 20/58* (2022.01); *G06V 40/10* (2022.01); *G06V 40/20* (2022.01); *H04W 4/40* (2018.02); *B60W 2556/45* (2020.02); *G05D 2105/22* (2024.01); *G05D 2109/10* (2024.01); *G05D 2111/32* (2024.01)

(56) References Cited

U.S. PATENT DOCUMENTS

2019/0172111 A1*   6/2019   Schoeffler .......... G06Q 30/0609
2020/0349666 A1*  11/2020   Hodge ............... G01C 21/3602

* cited by examiner

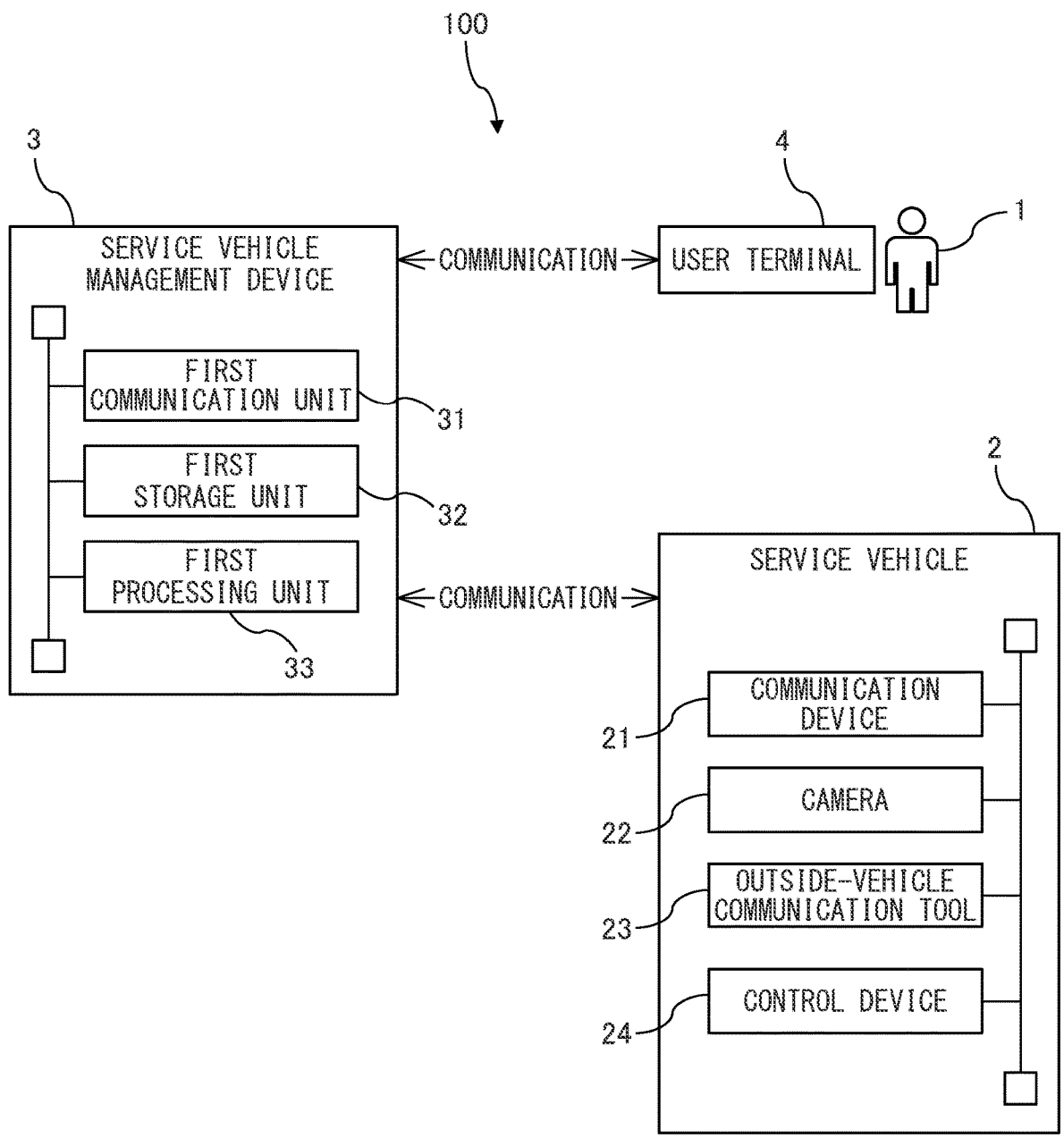

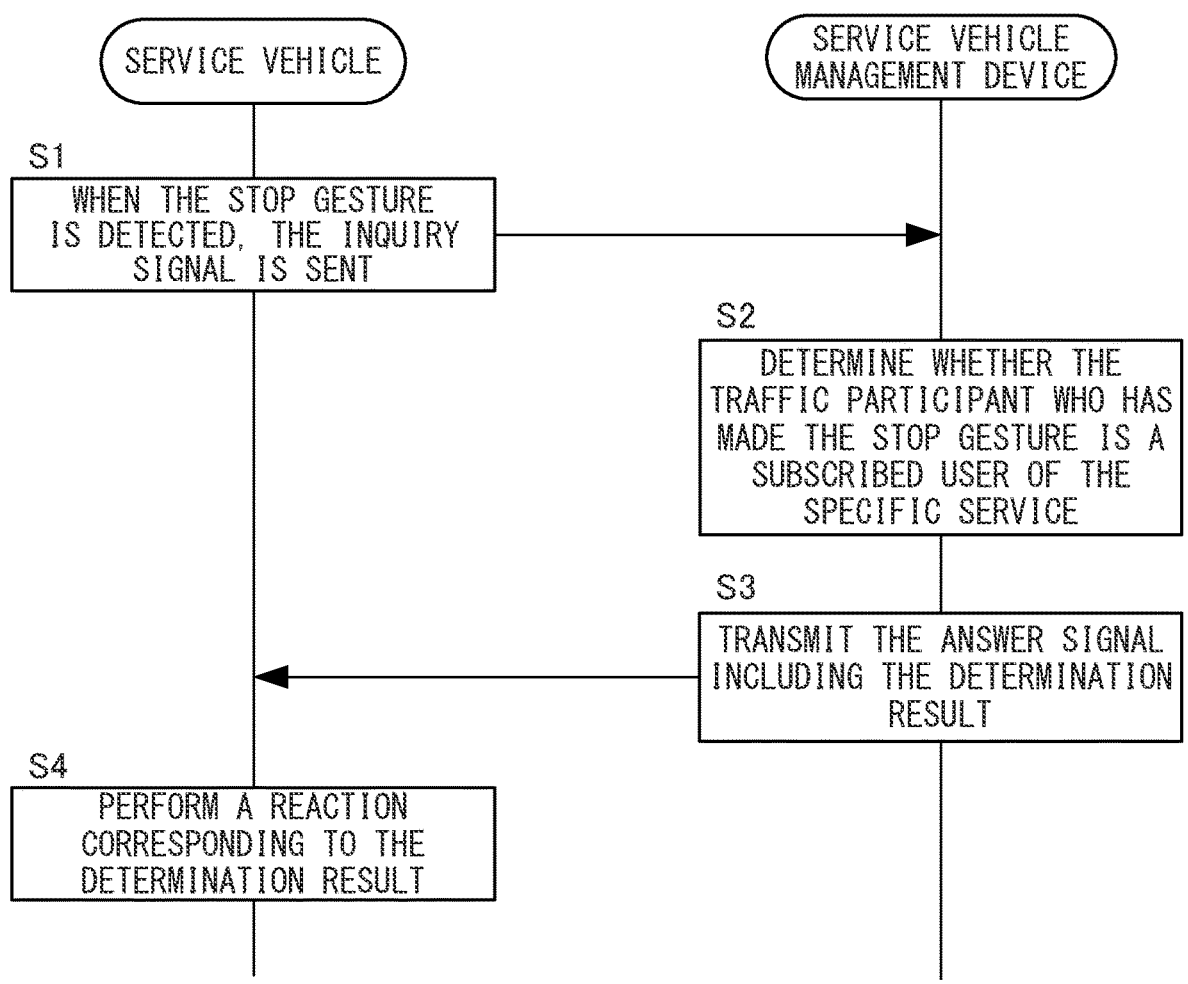

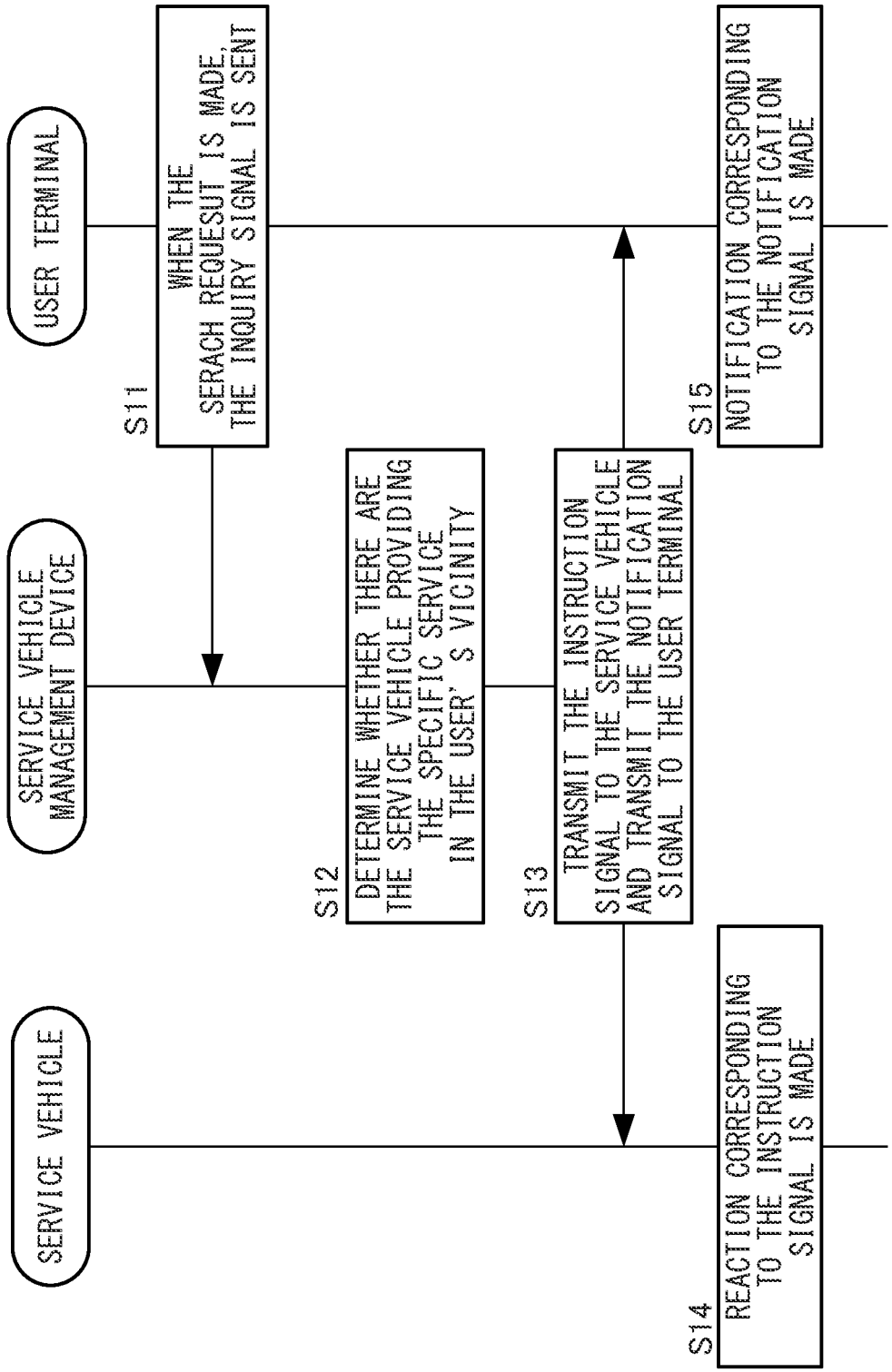

MOBILITY SYSTEM AND SERVER

CROSS-REFERENCE TO RELATED APPLICATION

This application claims priority to Japanese Patent Application No. 2022-211973 filed on Dec. 28, 2022, the entire contents of which are herein incorporated by reference.

FIELD

The present disclosure relates to a mobility system and a server.

BACKGROUND

JP2018-73351A discloses a conventional vehicle control system configured to output information to a person outside a vehicle regarding whether or not the person can enter the vehicle when the person raises his/her hand.

SUMMARY

A user who uses a mobility service such as a dispatch service or a merchandise sales service subscribes to a specific service such as a subscription service that can use the mobility service at a fixed amount. In such a case, when using the mobility service, the user naturally wishes to use a service vehicle that provides the specific service to which the user subscribes.

However, there may be the service vehicle that does not provide the specific service to which the user subscribes, for example, due to the presence of a plurality of operators that provide mobility services. Therefore, when the service vehicle is to be used, if it cannot be determined whether the service vehicle provides the specific service, the user may be dissatisfied with the quality of the service.

The present disclosure has been made focusing on such problems, and an object thereof is to be able to determine whether the service vehicle to be used is a service vehicle that provides the specific service.

In order to solve the above problem, a mobility system according to an aspect of the present disclosure includes a plurality of mobile objects capable of autonomous driving to provide a mobility service and a server configured to communicate with each of the plurality of mobile objects. The mobile object is configured to detect a position and a gesture of a traffic participant present in the vicinity of the mobile object based on peripheral data representing a situation in the vicinity of the mobile object, determine if the gesture is a stop request and transmit, in response to the gesture being the stop request, an inquiry signal including position information of the traffic participant to the server in order to confirm whether the mobile object provides a specific service to which the traffic participant who has performed the gesture subscribes. The server is configured to determine, in response to receiving the inquiry signal, whether the traffic participant who made the gesture is one of users subscribed to the specific service based on the position information of the traffic participant included in the inquiry signal and position information for each user that is periodically received from a terminal had by each user subscribing to the specific service and transmit an answer signal including a result of the determination to the mobile object. The mobile object is further configured to perform, in response to receiving the answer signal, an action according to a result of the determination included in the answer signal.

Further, according to an aspect of the present disclosure, a server configured to be able to communicate with a plurality of mobile objects capable of autonomous driving to provide a mobility service is configured to determine, in response to receiving a predetermined inquiry signal from a terminal had by a user who wishes to use the mobility service, whether the mobile object providing the specific service to which the user subscribes is in the vicinity of the user, based on position information of the user included in the inquiry signal and position information of each mobile objects periodically received from each mobile objects and transmit, in response to the presence of the mobile object in the vicinity of the user that provides the specific service to which the user subscribes, an instruction signal to the mobile object instructing the mobile object to perform an action according to the result of the determination.

According to these aspects of the present disclosure, if the service vehicle that the user is about to use is a service vehicle that provides a specific service, the service vehicle can take some reaction. Therefore, the user can determine whether the service vehicle is a service vehicle that provides a specific service.

BRIEF DESCRIPTION OF DRAWINGS

FIG. 1 is a schematic view of the configuration of a mobility system according to a first embodiment of the present disclosure.

FIG. 2 is a diagram for explaining the contents and flow of processing performed by a service vehicle and a service vehicle management device when a traffic participant makes a stop gesture to the service vehicle running on a road.

FIG. 3 is a diagram for explaining the contents and flow of processing performed by a user terminal carried by a user, a service vehicle and a service vehicle management apparatus, when determining the service vehicle that provides the specific service to the user subscribes in a place where a large number of service vehicles collect.

DESCRIPTION OF EMBODIMENTS

Below, referring to the drawings, an embodiment of the present disclosure will be explained in detail. Note that, in the following explanation, similar component elements will be assigned the same reference notations.

First Embodiment

FIG. 1 is a schematic view of the configuration of a mobility system 100 according to a first embodiment of the present disclosure.

The mobility system 100 is a system for enabling a user 1 using a mobility service such as a dispatch service or a merchandise sales service to determine, from among a plurality of service vehicles 2 providing a mobility service, a service vehicle providing a specific service such as a subscription service to which the user 1 is subscribed.

The mobility system 100 according to the present embodiment includes a service vehicle 2 and a service vehicle management device 3. In the present embodiment, an example in which the service vehicle 2 is a taxi will be described.

The service vehicle 2 is an autonomous vehicle can drive independently and provides the mobility service. The service vehicle 2 includes a communication device 21, a camera 22, an outside-vehicle communication tool 23, and a control device 24. The communication device 21, the camera 22, the outside-vehicle communication tool 23, and the control device 24 are communicably connected to each other via an in-vehicle network compliant with a standard such as a controller area network.

The communication device 21 has a communication interface circuit for connecting to a network constituted by an optical communication line or the like, and is configured to be able to communicate by connecting the service vehicle 2 to the service vehicle management device 3 via the network.

The camera 22 captures an image of the surroundings of the service vehicle 2 at a predetermined frame rate (e.g., 10 [Hz] to 40 [Hz]) and generates an image of the surroundings of the service vehicle 2. Each time the image is generated, the camera 22 transmits the generated image to the control device 24.

The outside-vehicle communication tool 23 is a device that can be used to communicate with a traffic participant outside the service vehicle 2 through a physical sensation (for example, visual or auditory) of the traffic participant. Examples of the outside-vehicle communication tool 23 include a display device (so-called outside HMI) that displays characters, images, and the like to traffic participants, an audio output device that outputs sound to traffic participants, a light emitting device that emits light to traffic participants, and a light emitting device that emits light with directivity toward traffic participants. The outside-vehicle communication tool 23 may be a dedicated tool for communicating with a traffic participants, or may be realized by using a tool such as a horn, a headlamp, or a hazard lamp.

The control device 24 is an ECU (Electronic Control Unit) that comprehensively controls the entire operation of the service vehicle 2.

The control device 24 sequentially inputs the images received from the camera 22 to an identifier such as a convolutional neural network (CNN) having a plurality of convolutional layers connected in series, for example, from an input side to an output side, thereby detecting a positional relationship with a traffic participant existing in front of the service vehicle 2, a gesture of the traffic participant, and the like. In addition, the control device 24 determines whether the gesture of the traffic participant is a stop request such as, for example, raising a hand, and performs a reaction according to the determination result via the outside-vehicle communication tool 23.

In addition to the image described above, the control device 24 receives various types of data (for example, current position data acquired by the positioning sensor) necessary for performing the autonomous driving. The control device 24 performs the autonomous driving based on these input data.

The service vehicle management apparatus 3 is an apparatus for managing the service vehicle 2, and includes a first communication unit 31, a first storage unit 32, and a first processing unit 33.

The first communication unit 31 has a communication interface circuit for connecting the service vehicle management device 3 to a network constituted by an optical communication line or the like, and is configured to be able to communicate by connecting the service vehicle management device 3 to the service vehicle 2 via the network.

The first storage unit 32 includes a storage medium such as HDD (Hard Disk Drive), SSD (Solid State Drive), or semiconductor-memory, and stores various computer programs and data used for processing in the first processing unit 33.

The first processor 33 includes one or a plurality of CPU (Central Processing Unit) and peripheral circuits thereof, and executes various computer programs stored in the first storage unit 32 to comprehensively control the overall operation of the service vehicle management device 3, and is, for example, a processor. As an example of the processing performed by the first processing unit 33, for example, the first processing unit 33 determines whether the service vehicle 2 is a service vehicle providing the specific service to which the traffic participant subscribes, based on a request from the service vehicle 2 that detects the traffic participant making a gesture that can be estimated as a stop request (hereinafter, referred to as a "stop gesture"), and transmits the determination result to the service vehicle 2.

FIG. 2 is a diagram for explaining the contents and flow of processing performed by the service vehicle 2 and the service vehicle management device 3 when the traffic participant makes the stop gesture to the service vehicle 2 running on a road.

In the present embodiment, it is assumed that each user 1 of the mobility service subscribing to the specific service periodically transmits his/her position information to the service vehicle management device 3 via a user terminal 4 (refer to FIG. 1) such as a smartphone or a tablet computer capable of communicating with the service vehicle management device 3 via a network constituted by an optical communication line or the like. In other words, in the present embodiment, it is assumed that the service vehicle management device 3 can identify the current position of each user 1 of the mobility service subscribing to a specific service.

At step S1, the control device 24 of the service vehicle 2 detects the position of the traffic participant present in front of the host vehicle on the basis of the surrounding images received from the cameras 22, and determines whether the traffic participant takes the stop gesture. Then, if the traffic participant makes the stop gesture and the vehicle is in a state (e.g., an unoccupied state) in which the vehicle can receive the stop request, the control device 24 of the service vehicle 2 transmits an inquiry signal including a position information of the traffic participant who has made the stop gesture, an identification information of the vehicle (e.g., the vehicle number and the like), and a position information of the vehicle to the service vehicle management device 3 in order to confirm whether the vehicle provides the subscription service to which the traffic participant who has made the stop gesture has subscribed.

In a state where the vehicle cannot accept the stop request, the control device 24 of the service vehicle 2 notifies the traffic participant who has made the stop gesture of the fact by the outside-vehicle communication tool 23.

At step S2, when receiving the inquiry signal, the service vehicle management device 3 determines whether the traffic participant is one of the users of the mobility service subscribed to the specific service based on the degree of coincidence between the position information of the traffic participant who took the stop gesture included in the inquiry signal and the location information of each user 1 periodically received from each user 1 of the mobility service subscribed to the specific service. Further, the service vehicle management device 3 specifies the service vehicle 2 of the transmission source of the signal based on the identification information included in the inquiry signal, and temporarily sets the specified service vehicle 2 to a state in which the other stop request and the pick-up request (net reservation or the like) from the service vehicle management device 3 cannot be accepted.

At step S3, the service vehicle management device 3 transmits, to the service vehicle 2 that is the transmission source of the inquiry signal, an answer signal including a determination result as to whether or not the traffic participant who has made the stop gesture is the user 1 who has subscribed to the particular service. In other words, the service vehicle management device 3 transmits, to the service vehicle 2, an answer signal including a determination result of whether or not the service vehicle 2 that is the transmission source of the inquiry signal is the service vehicle corresponding to the specific service to which the traffic participant who has made the stop gesture subscribes.

At step S4, the control device 24 of the service vehicle 2 receives the answer signal and performs a reaction corresponding to the determination result included in the answer signal via the outside-vehicle communication tool 23.

For example, if the outside-vehicle communication tool 23 is a display device (so-called external HMI) that displays characters, images, and the like to the traffic participant, and the service vehicle 2 is a service vehicle providing the specific service to which the traffic participant who has made the stop gesture subscribes, the content (first notification) to that effect can be displayed on the display device. Then, if the service vehicle 2 is a service vehicle that does not provide the specific service to which the traffic participant who has made the stop gesture subscribes, the content (second notification different from the first notification) indicating this can be displayed on the display device.

Further, if for example, the outside-vehicle communication tool 23 is a light-emitting device that emits light to a traffic participant, and the service vehicle 2 is a service vehicle providing the specific service to which the traffic participant who has made the stop gesture subscribes, this fact can be indicated to the traffic participant in the first light-emitting mode (color, number of blinks, and the like). In a case where the outside-vehicle communication tool 23 is an audio output device, it is also possible to indicate the fact to the traffic participant in the same manner in the first audio output mode (such as a guidance display in a voice or the number of times of a horn). Then, if service vehicle 2 is a service vehicle that does not provide the specific service to which the traffic participant who has made the stop gesture subscribes, this fact can be indicated to the traffic participant in a second light-emitting mode different from the first light-emitting mode. When the outside-vehicle communication tool 23 is an audio output device, it can also be shown to the traffic participant in a second audio output manner different from the first audio output manner.

Further, if for example, the outside-vehicle communication tool 23 is a light irradiation device that irradiates a light beam having directivity toward the traffic participant and the service vehicle 2 is a service vehicle providing the specific service to which the traffic participant who has made the stop gesture subscribes, the traffic participant who has made the stop gesture can be irradiated with a light beam.

In a case where the traffic participant who has made the stop gesture indicates the intention to cancel the boarding as a result of the reaction corresponding to the determination result (for example, a case where the traffic participant makes a gesture indicating an intention to cancel or a case where the traffic participant did not take the car for a certain period of time even after the stop), the control device 24 of the service vehicle 2 resumes the traveling without letting the traffic participant who has made the stop gesture enter the service vehicle 2.

The mobility system 100 according to the present embodiment described above includes a plurality of service vehicles 2 (mobile objects) capable of autonomous driving to provide mobility services, and the service vehicle management device 3 (server) configured to communicate with each of the plurality of service vehicles 2.

The service vehicle 2 is configured to detect a position and a gesture of a traffic participant present in the vicinity of the service vehicle 2, based on peripheral data representing a situation in the vicinity of the service vehicle 2, determine if the gesture is a stop request, and transmit, in response to the gesture being the stop request, an inquiry signal including position information of the traffic participant to the server in order to confirm whether the service vehicle 2 provides a specific service to which the traffic participant who has made the gesture subscribes. The service vehicle management device 3 is configured to determine, in response to receiving the inquiry signal, whether the traffic participant who has made the gesture is one of users subscribed to the specific service based on the position information of the traffic participant included in the inquiry signal and position information for each user that is periodically received from a terminal had by each user subscribing to the specific service, and transmit an answer signal including a result of the determination to the mobile object.

The service vehicle 2 is further configured to perform, in response to receiving the answer signal, an action according to a result of the determination included in the answer signal. Specifically, the service vehicle 2 includes the outside-vehicle communication tool 23 (communication tool) configured to communicate with the traffic participant, and is configured to notify, in response to the traffic participant who has made the gesture being one of the users subscribed to the specific service, the user of this fact in a first mode via the outside-vehicle communication tool 23. Further, the service vehicle 2 is configured to notify, in response to the fact that the traffic participant who has made the gesture is not a user subscribed to the specific service, the user of this fact via the communication tool in a second mode that differs from the first mode.

According to the present embodiment, when the user 1 who intends to utilize the mobility service makes the stop gesture to the service vehicle 2, the service vehicle 2 provides a response to the user 1 in order to let the user 1 know whether it provides the specific service. Thus, the user 1 can easily determine whether the service vehicle 2 is a service vehicle that provides the specific service to which the user 1 subscribes.

Second Embodiment

Next, a second embodiment of the present disclosure will be explained. This embodiment is different from the first embodiment in that, for example, in a place where a large number of service vehicles 2 such as a station, a commercial facility, and an accommodation facility are gathered, the user 1 can determine a service vehicle 2 providing the specific service to which the user 1 has subscribed. Hereinafter, the differences will be mainly explained.

FIG. 3 is a diagram for explaining the contents and flow of processing performed by the user terminal 4 carried by the user 1, the service vehicle 2 and the service vehicle management apparatus 3, when determining the service vehicle 2 that provides the specific service that the user 1 has subscribed to in a place where a large number of service vehicles collect.

In the present embodiment, it is assumed that the service vehicle 2 periodically transmits the position information of the service vehicle 2 to the service vehicle management apparatus 3. In other words, in the present embodiment, it is assumed that the service vehicle management device 3 can identify the current position of each service vehicle 2.

At step S11, the user 1 operates the user terminal 4 to activate a predetermined application, and performs a search request for the service vehicle 2 providing the specific service to which the user 1 is subscribed on the application. When the search request is executed via the application, the user terminal 4 transmits an inquiry signal including the position information of the user 1 to the service vehicle management device 3.

At step S12, when receiving the inquiry signal, the service vehicle management device 3 determines whether there is a service vehicle 2 that exists around the user 1 and provides the specific service that the user 1 has subscribed to, based on the position information of the user 1 included in the inquiry signal and the position information of each service vehicle 2 that is periodically received from each service vehicle 2.

At step S13, when the service vehicle 2 providing the specific service to which the user 1 is subscribed is present near the user 1, the service vehicle management device 3 transmits an instruction signal to the service vehicle 2 and transmits a notification signal to the user terminal 4 that is a source of the inquiry signal.

The instruction signal is a signal for instructing the service vehicle 2 to perform an action for notifying the surrounding traffic participant that the service vehicle 2 is a service vehicle providing the specific service. The notification signal is a signal for instructing the user terminal 4, which is the transmission source of the inquiry signal, to notify the user 1 via the application of the upcoming action to be taken by the service vehicle 2 providing the specific service.

At step S14, when the service vehicle 2 receives the instruction signal, it notifies the people around the service vehicle 2 that the service vehicle 2 is a service vehicle providing the specific service via the outside-vehicle communication tool 23.

At step S15, when the user terminal 4 receives the notification signal, it notifies the user 1 via the application of the contents of the action to be performed henceforth by the service vehicle 2 providing the specific service.

As a result, the user 1 can easily determine a service vehicle providing the specific service to which the user is subscribed from among the plurality of service vehicles 2 present around the user 1.

When the determination of the step S12 reveals that the service vehicles 2 providing the specific service is not available in the vicinity the user 1, only the notification to that effect may be transmitted to the user terminal 4 that is the source of the inquiry.

The service vehicle management device 3 (server) according to the present embodiment described above is configured to determine, in response to receiving a predetermined inquiry signal from the user terminal 4 (terminal) had by the user 1 who wishes to use the mobility service, whether the service vehicle 2 (mobile object) providing the specific service to which the user 1 subscribes is in the vicinity of the user 1 based on position information of the user 1 included in the inquiry signal and position information of each service vehicles 2 periodically received from each service vehicles 2 and is configured to transmit, in response to the presence of the service vehicle 2 in the vicinity of the user 1 that provides the specific service to which the user 1 subscribes, an instruction signal to the service vehicle 2 instructing the service vehicle 2 to perform an action according to the result of the determination.

Further, the service vehicle management device 3 according to the present embodiment is configured to transmit, in response to the presence of the service vehicle 2 in the vicinity of the user 1 that provides to the specific service to which the user 1 subscribes, a notification signal, instructing the user to be notified of the contents of the action to be performed by the service vehicle 2, to the user terminal 4 of the user 1.

Thus, the user 1 can easily determine a service vehicle providing the specific service to which the user is subscribed from the plurality of service vehicles 2 present in the vicinity of the user Above, embodiments of the present disclosure were explained, but the embodiments only show some of the examples of application of the present disclosure and are not intended to limit the technical scope of the present disclosure to the specific constitutions of the embodiments.

For example, in the above-described embodiment, the computer program executed in the control device 24, the service vehicle management device 3, and the user terminal 4 of the service vehicle 2 may be provided in a form recorded in a computer-readable portable recording medium such as a semiconductor memory, a magnetic recording medium, or an optical recording medium.

The invention claimed is:

1. A mobility system comprising:
a mobile object configured to autonomously drive to provide a mobility service; and
a server configured to communicate with the mobile object, wherein
the mobile object is configured to:
detect a position and a gesture of a traffic participant existing in the vicinity of the mobile object, based on peripheral data representing a situation in the vicinity of the mobile object by capturing a first image of the vicinity at a predetermined frame rate, and transmitting a second image based on the first image;
determine if the gesture is a stop request;
confirm whether the mobile object provides a specific service to which the traffic participant who has performed the gesture is subscribed by transmitting, in response to the gesture being the stop request, identification information of the mobile object, position information of the mobile object, and an inquiry signal to the server, the inquiry signal including position information of the traffic participant, and
the server is configured to:
determine, in response to receiving the inquiry signal, whether the traffic participant who made the gesture is one of users subscribed to the specific service, based on the position information of the traffic participant included in the inquiry signal and position information for each user that is periodically received from a terminal provided to each user subscribing to the specific service;
transmit an answer signal including a result of the determination to the mobile object, and the mobile object is further configured to perform, in response to receiving the answer signal, an action according to a result of the determination included in the answer signal;
determine whether the mobile object is in a predetermined mobile object state in which the mobile object can receive the stop request, the predetermined mobile object state including a state in which the mobile object is in an unoccupied state; and
control, in response to determining that the mobile object receives the stop request, the mobile object to operate in a second state in which the mobile object cannot accept one or more additional stop requests wherein the mobile object is configured to, in response to determining that the traffic participant does not take the mobile object for a predetermined period of time after accepting the received stop request, resume traveling.

2. The mobility system according to claim 1, wherein
the mobile object comprises a communication tool configured to communicate with the traffic participant, and
the mobile object is configured to notify, in response to the traffic participant who made the gesture being one of the users subscribed to the specific service, the user of this fact in a first mode via the communication tool.

3. The mobility system according to claim 2, wherein,
the mobile object is configured to notify, in response to the fact that the traffic participant who made the gesture is not a user subscribed to the specific service, the user of this fact via the communication tool in a second mode that differs from the first mode.

* * * * *